United States Patent Office 2,972,809
Patented Feb. 28, 1961

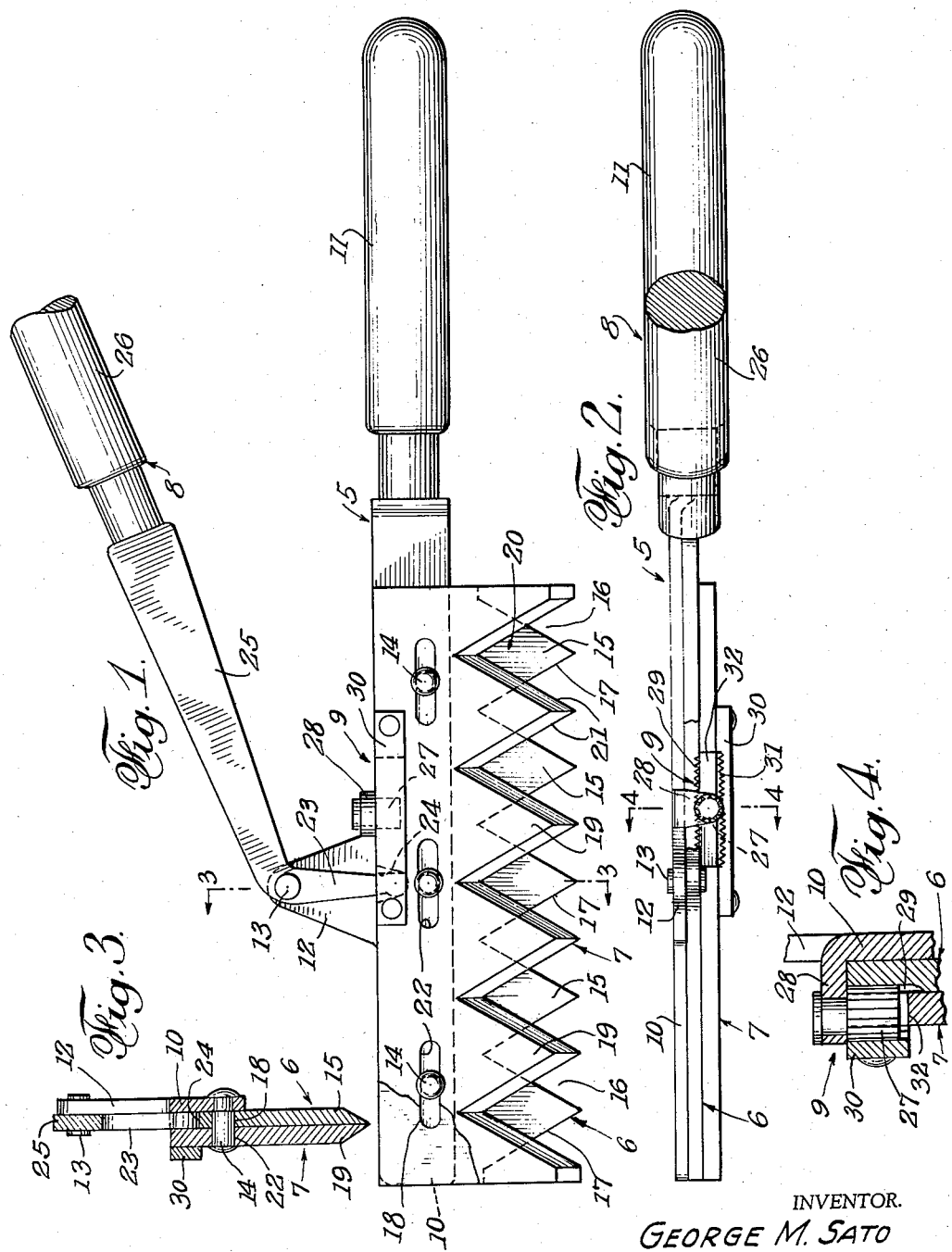

2,972,809

HEDGE TRIMMER

George M. Sato, 133 S. Vancouver Ave.,
Los Angeles, Calif.

Filed July 6, 1959, Ser. No. 825,240

6 Claims. (Cl. 30—209)

This invention relates to a hedge trimmer and has for an object to provide an instrument of this nature that is convenient to use, efficient in operation, and capable of use over long periods of time without undue tiring by the user.

Another object of the invention is to provide a trimmer or shears of the character referred to that has a longitudinal arrangement of shear blades and operating handles, thereby greatly contributing to the ease and efficiency of use of the instrument.

A further object of the invention is to provide a shrubbery trimmer that longitudinally and oppositely moves the cutting blades thereof relative to the operating handles, the same, thereby, more effectively centering twigs and branches being cut to obviate their accidental displacement from between the teeth of the blades.

A still further object of the invention is to provide a shrubbery trimmer in which handle-imparted movement of one cutter blade is transferred to the other blade to move the blades oppositely so that double-acting cutting is effected with each movement of the blades.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a partly broken side elevational view of a hedge trimmer according to the present invention.

Fig. 2 is an edge view as seen from the top of Fig. 1.

Fig. 3 is a cross-sectional view as taken on the line 3—3 of Fig. 1.

Fig. 4 is an enlarged fragmentary sectional view as taken on line 4—4 of Fig. 2.

The hedge trimmer that is illustrated comprises, generally, a handle unit 5, two cooperating cutters or blades 6 and 7 carried by the unit 5, a handle 8 carried by the unit 5 and engaged with the blade 6 to move the latter longitudinally relative to said unit 5, and means 9 interconnecting the blades 6 and 7 and producing a movement of the blade 7 that is equal and opposite to the movement of blade 6.

The handle unit 5 is shown as comprising an elongated strap or bar 10 and a handle 11 extending from one end of said strap or bar. Intermediate its ends, the latter is formed to have an upwardly directed bracket extension 12 on which is carried a pivot 13. Two or more studs 14, in this case three, are provided on said strap or bar in longitudinally spaced relation, the studs extending laterally from one face of said strap or bar.

The cutter blade 6 is formed of hardened metal and, along one edge thereof, the same is provided with a plurality of cutter teeth 15 that are preferably deep and of triangular form, substantially as shown. The notches 16 formed by said teeth are adapted to receive twigs, branches, etc. to be cut by the teeth edges 17. Beyond said teeth, the blade 6 is provided with a longitudinal slot 18 for each stud 14, said studs extending through said slots in the manner indicated in Figs. 1 and 3. Thus, the blade 6 is adapted to have a flatwise position against the strap or bar 10 and is so mounted on studs 14 as to be movable longitudinally in a reciprocative manner relative to said strap or bar.

The cutter blade 7 is somewhat similar to the blade 6 in that it is provided with similar, but complementary, cutter teeth 19 that define notches 20 between the edges 21 of the teeth, and is provided with stud-engaging slots 22 similar to the slots 18. As can be seen from Fig. 1, when the blades 6 and 7 are so superposed as to bring their slots into register, the teeth 15 and 19 are in staggered or offset relation. With the studs 14 centrally in said registered slots, the blades 6 and 7 are in an intermediate position from which they may be moved in either direction relatively oppositely to cause the blade edges 17 and 21 to cut or shear into members in the notches between the blades.

It will be clear that the slots 18 and 22 are of such length that full and opposite cutting stroke of the blades is permitted before movement is arrested by the studs 14.

The handle 8 is formed as a bellcrank lever having its fulcrum at pivot 13, an arm 23 extending from said pivot into a notch 24 in the upper longitudinal edge of the blade 6, an arm 25 extending in a direction to be coextensive, at least in part, with the strap or bar 10 between extension 12 and handle 11, and a handle 26 extending from the end of arm 25.

Because of the extension 12, said handle 26 has a spaced relation to handle 11 and, because of pivot 13, said handle 26 may be pivotally moved relative to handle 11 to cause the end of arm 23 to oscillate and, thereby, cause reciprocation of the cutter 6 relative to the strap or bar 10.

The means 9 is shown as a toothed or roughened wheel 27 that is carried by a bracket 28 bent from strap or bar 11 on an axis that is parallel to the planes of the cutter blades 6 and 7. Blade 6 is provided with complementary teeth or roughening 29, and a member 30 has similar teeth or roughening 31 in opposed spaced relation to the teeth or roughening 29. The wheel 27 resides in the space between and is in mesh with teeth 29 and 31 and thereby interconnects the blades 6 and 7.

Since the axis of wheel 27 is fixedly carried by strap 10, the mentioned movement by handle 26 of the blade 6 is translated by the means 9 into an equal and opposite movement of blade 7. This, of course, is due to the rack and pinion interconnection of the blades that is afforded by the means 9.

It will be noted that blade 7 is provided with a slot 32 in which the wheel 27 is accommodated. In this case, the handle 26 moves blade 6 and the latter moves blade 7. The reverse may be effected by engaging the lever arm 23 with the blade 7 instead of with blade 6. The same may be readily accomplished by offsetting said arm 23 to be in the plane of blade 7 or offsetting bracket extension 12 so as to bring the arm 23 into coplanar alignment with the blade 7.

While the foregoing has illustrated and described what I now contemplate to be the best mode of carrying out my invention, the construction is, of course, subject to modification without departing from the spirit and scope of my invention. Therefore, I do not desire to restrict the invention to the particular form of construction illustrated and described, but to cover all modifications that may fall within the scope of the appended claims.

Having thus described my invention, what I claim and desire to secure by Letters Patent is:

1. A hedge trimmer comprising an elongated member provided with a fixed handle, two cutter blades superposed on each other and on said member, a handle-provided lever pivotally carried by said member and engaged to move one of the cutter blades longitudinally relative to said member, and means interconnecting the blades to move the other blade oppositely to the blade moved by the lever.

2. A hedge trimmer comprising an elongated member provided with a fixed handle, two cutter blades superposed on each other and on said member, means interconnecting the blades and member for relative movement one to the other, a handle-provided lever pivotally carried by said member and engaged to move one of the cutter blades longitudinally relative to said member, and means interconnecting the blades to move the other blade oppositely to the blade moved by the lever.

3. A hedge trimmer according to claim 2 in which the handle on the elongated member extends longitudinally from the end of the member, and the handle on the lever is partly coextensive therewith and moves on its pivot toward and from the fixed handle.

4. A hedge trimmer comprising an elongated member provided with a fixed handle, two cutter blades superposed on each other and on said member, a handle-provided lever pivotally carried by said member and engaged to move one of the cutter blades longitudinally relative to said member, and gear and rack means interconnecting the blades to move the other blade oppositely to the blade moved by the lever.

5. A hedge trimmer according to claim 4 in which the gear of the mentioned gear and rack means is carried by the elongated member and the blades are provided with opposed racks in mesh with the gear.

6. A hedge trimmer according to claim 4 in which the last-mentioned means comprises oppositely spaced-apart rack teeth provided on the two blades, a pinion in common mesh with said teeth, and means to mount the pinion on the elongated member.

References Cited in the file of this patent

UNITED STATES PATENTS

| | | |
|---|---|---|
| 1,642,532 | Beauregard | Sept. 13, 1927 |
| 1,980,092 | Rose | Nov. 6, 1934 |
| 2,756,500 | Green | July 31, 1956 |